United States Patent
Laurinavichus (10) Patent No.: US 7,894,587 B1
(45) Date of Patent: Feb. 22, 2011

(54) SYSTEM AND METHOD FOR DYNAMIC ASSIGNMENT OF DIALED NUMBER IDENTIFICATION SERVICES IN CALL DISTRIBUTION SYSTEM

(75) Inventor: Vladislav I. Laurinavichus, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1420 days.

(21) Appl. No.: 10/964,769

(22) Filed: Oct. 15, 2004

(51) Int. Cl.
*H04M 3/42* (2006.01)

(52) U.S. Cl. .................. 379/207.14; 379/142.01; 379/142.04; 379/142.1; 379/207.15; 379/220.01

(58) Field of Classification Search ............ 379/142.01, 379/142.04, 142.1, 207.14, 207.15, 220.01
See application file for complete search history.

(56) References Cited

U.S. PATENT DOCUMENTS

| | | | |
|---|---|---|---|
| 4,656,658 A | | 4/1987 | King |
| 5,848,131 A | * | 12/1998 | Shaffer et al. ............... 379/88.2 |
| 5,862,203 A | | 1/1999 | Wulken et al. |
| 6,111,945 A | | 8/2000 | Goel et al. |
| 6,366,668 B1 | | 4/2002 | Borst et al. |
| 6,661,882 B1 | * | 12/2003 | Muir et al. ............. 379/127.01 |
| 6,801,613 B1 | | 10/2004 | Hamilton |
| 6,970,548 B2 | | 11/2005 | Pines et al. |
| 7,079,849 B2 | * | 7/2006 | Hanson ................... 455/456.1 |
| 7,145,898 B1 | | 12/2006 | Elliott |
| 7,180,993 B2 | | 2/2007 | Hamilton |
| 2004/0252822 A1 | * | 12/2004 | Statham et al. ........ 379/265.02 |
| 2005/0084088 A1 | | 4/2005 | Hamilton |
| 2005/0195741 A1 | | 9/2005 | Doshi et al. |

OTHER PUBLICATIONS

Office Action in U.S. Appl. No. 10/981,600, mailed Feb. 2, 2010.
Office Action in U.S. Appl. No. 10/981,600, mailed Sep. 9, 2009.
Office Action in U.S. Appl. No. 10/981,600, mailed Mar. 4, 2009.
Office Action in U.S. Appl. No. 10/981,600, mailed Aug. 28, 2008.
Office Action mailed Jul. 20, 2010 in U.S. Appl. No. 10/981,600, 7 pages.

* cited by examiner

*Primary Examiner*—Curtis Kuntz
*Assistant Examiner*—Yosef K Laekemariam (57) ABSTRACT

A system and related techniques enhance the generation and delivery of dialed number identification service (DNIS) data to automatic call distributors and other destinations. Unlike conventional DNIS-based (800) or other call centers or other resources whose available DNIS-based identifications can become overtaxed during comparatively high call volumes, according to embodiments of the invention DNIS numbers are dynamically generated from an available pool on a per-call basis under call router supervision. According to embodiments of the invention in one regard, the dynamic DNIS may be associated with that call to the call's particular destination, such as an automatic call distributor, interactive voice response unit or other resource, during the duration of the call for the operative destination, with other calls being locked out from using that DNIS assignment while the call is in progress. The DNIS digits along with other tag or label information may likewise be used as a temporary key to access associated call data, such as dialed number, caller entered or other data or information, which may be stored in a data store for access by customer service representatives (CSRs) or others. After the call is completed, the temporarily assigned DNIS number may be released back to the pool for use by other calls to that destination.

36 Claims, 5 Drawing Sheets

SYSTEM AND METHOD FOR DYNAMIC ASSIGNMENT OF DIALED NUMBER IDENTIFICATION SERVICES IN CALL DISTRIBUTION SYSTEM

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of communications, and more particularly to an environment for delivering (800) number and other calls to automatic call distributors or other destinations, using a dynamic assignment of called number identification services and other call-tagging information.

BACKGROUND OF THE INVENTION

Call center and other computerized telephony operations in the past have sometimes economized on network infrastructure by sharing physical communications connections. In these arrangements, a company or group of separate companies may for example publicize multiple (800) or other numbers for various types of customer support or other operations. For instance, a large financial institution may offer one (800) for retail banking accounts, another (800) number for mutual fund clients and another (800) for brokerage trading. While those numbers may be separate, each number may be channeled over long distance or other networks to one physical trunk or connection, to economize of network costs and maintenance.

Figure 1:
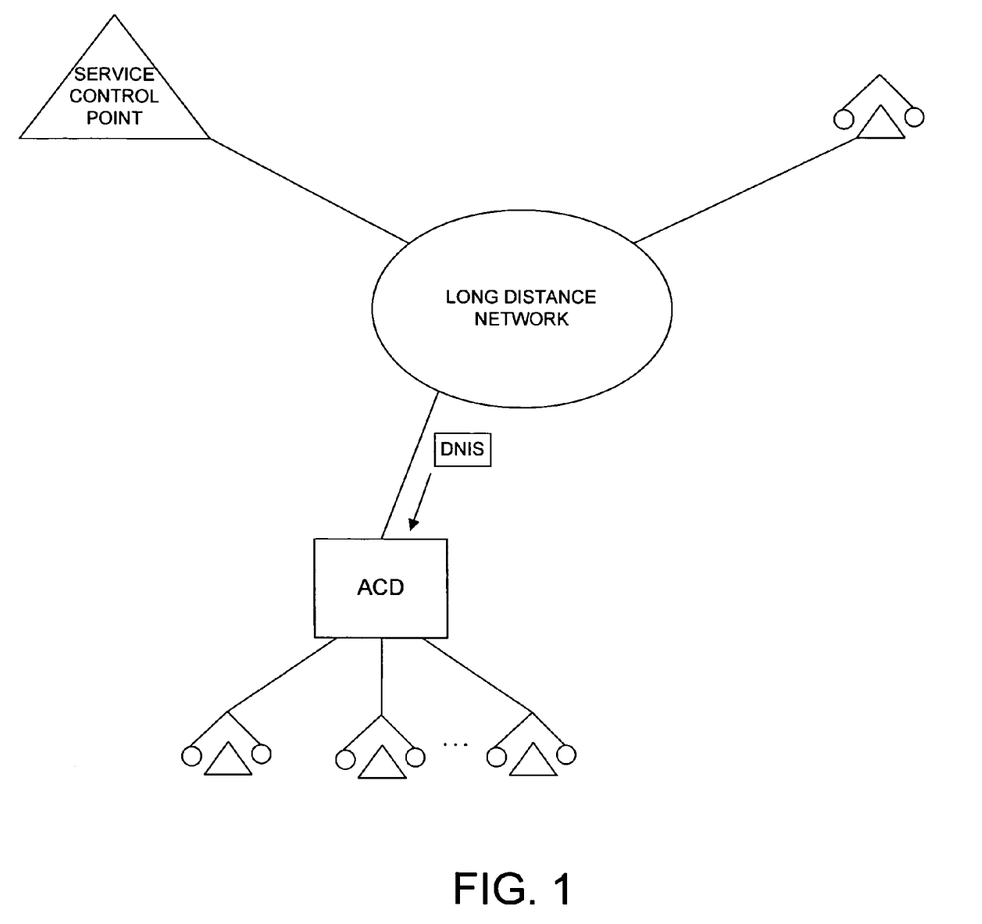
FIG. 1 illustrates the distribution of calls in a call center, according to conventional dialed number identification service technology.

When multiple (800) or other numbers are logically shared over common network resources, it has been known in the past to identify calls coming in over one number or another using the dialed number identification service (DNIS). For instance as illustrated in FIG. 1, a call arriving over a long distance network may be managed by a service control point (SCP) or other resource, under the signaling system 7 (SS7) or other architecture. The SCP may detect or receive the caller's dialed number (DN) such as a 10-digit (800) number, the number from which the call is being made via automatic number identification (ANI), caller ID or other services, and use that information to deliver the call to an appropriate destination.

That destination may be or include, for example, an automatic call distributor (ACD), an interactive voice response (IVR) unit, or other destination or resource. That ACD or other hardware or software may be correspondingly programmed or equipped with tools or applications to service specific types of calls, such as account inquiries, transactions, subscription or other inquiries or support. The call may be delivered to that ACD or other destination over common telephone, data or other links, along with other calls, for instance over T-1 or other lines.

To ensure that the call which is being sent over the common lines or connections is properly identified and delivered to the most appropriate ACD, the SCP or other controller may employ the known DNIS system to identify the dialed number from which the call originated. According to that system, the SCP or other controller may transmit call-identifying tag or other information based on or related to the originally dialed number to the destination ACD. That DNIS tag, label or other identifying information may be or include, for instance, a 3 or 4-digit code appended to or associated with the destination number. The DNIS information may also be encoded in other formats.

The DNIS information may be transmitted to the ACD or other destination through in-band signaling in the voice channel. Typically that information is transmitted using dual tone multiple frequency (DTMF) or other tones or signals through the voice channel. Once the ACD or other destination has decoded the DNIS digits, that resource can distribute or process the call according to the dialed (800) or other numbers, for instance to invoke a voice menu, distribute the call to a customer support representative (CSR), or perform other processing.

While the conventional DNIS system functions adequately for the delivery of identified calls in environments including comparatively low-volume environments, there are still difficulties in ensuring DNIS-based call distribution in other contexts. One challenge is the delivery of DNIS-labeled calls in a high-volume environment. This problem arises in one regard because the number and capacity of communications links through which the call may be connected to the ACD or other destination may be limited. For instance, the network operator may lease T-1 or other lines and not be able to readily add capacity to those lines, when a comparatively greater call volume occurs.

Further, the SCP or other controller which associates a DNIS number or tag with a call to transmit in-band with the call is conventionally configured with a fixed translation table, so that given (800) numbers are always transmitted to given ACD or other resources using given DNIS numbers or tags. The total number of those assignments may therefore be fixed, and even when there may be on the order of hundreds of available DNIS numbers or associated labels or tags, call centers which experience hundreds or thousands of calls per minute may exceed the available set of DNIS/destination assignments, communications links or both. In those cases calls must remain in the default queue until DNIS and other resources free up, causing delays in response time and other customer metrics, or causing a call drop if the default queue is not suitably configured. Other problems in dialed number-based call distribution schemes exist.

SUMMARY OF THE INVENTION

The invention overcoming these and other problems in the art relates in one regard to a system and method for dynamic assignment of dialed number identification information, in which inbound (800) or other calls may be associated with DNIS numbers or other tags or identifiers which are not fixed or permanently assigned, but assigned on a dynamic basis based on available DNIS numbers and other varying conditions. In embodiments, the (800) or other call or transaction may be controlled by a service control point which in turn communicates with a routing engine. Unlike conventional architectures in which the service control point may generate DNIS assignments for given destinations based on a provisioned or hard-wired basis, according to embodiments of the invention the DNIS number and other accompanying labels or other information may be dynamically extracted from a lookup table or other source in the routing engine. The lookup table may contain a frequently updated pool of DNIS numbers which are locked for a given call to a given destination. This locking action may take the DNIS digits or code out of the available lookup pool during the duration of the call delivery, thereby preventing a conflict or mis-delivery of the call or call data to the destination. DNIS numbers may also similarly be used for other destinations simultaneously with other calls to other destinations. Because DNIS number assignments and other accompanying information may be accessed and generated by reference to a lookup table or other dynamic source, the total capacity of the system to deliver calls to ACDs and other destinations may be increased compared to systems which permanently assign DNIS numbers to destinations or other resources.

DETAILED DESCRIPTION OF EMBODIMENTS

Figure 2:
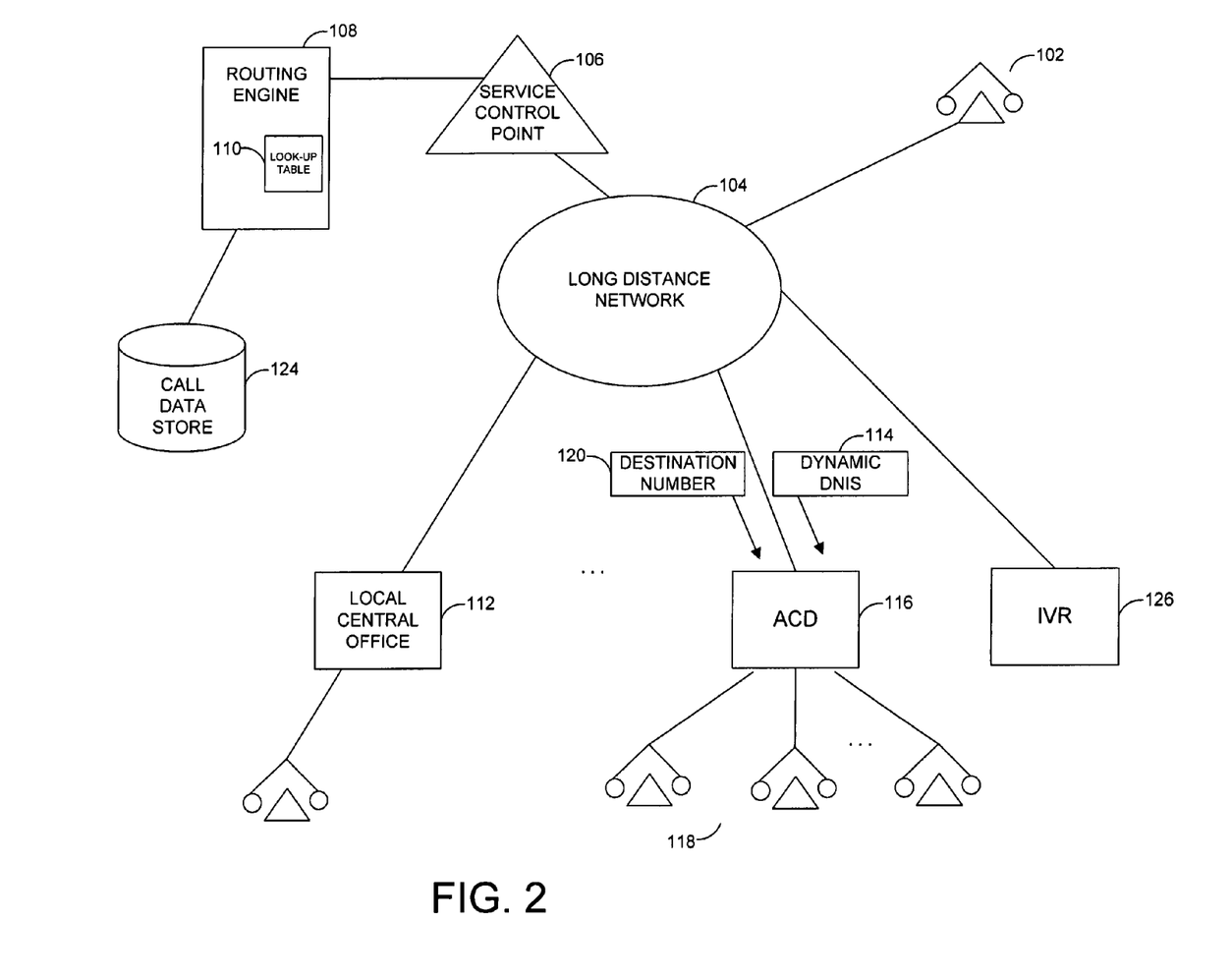
FIG. 2 illustrates an environment in which a system and method for a dynamic assignment of dialed number identification information may operate, according to embodiments of the invention.

FIG. 2 illustrates an environment in which a system and method for dynamic dialed number identification service may operate, according to an embodiment of the invention. As illustrated in that figure a caller 102 may initiate a call via a long distance network 104, or other network or connection. The caller 102 may initiate that call in a variety of ways, for instance by initiating a cellular call or other wireless call to a customer support number, or by dialing an (800) number, (900) number or other toll-free or other number via a landline connection through the public switched telephone network (PSTN) or other link. The call may likewise be initiated via a voice over Internet Protocol (VoIP) call or connection, or establishing a voice call or hybrid voice/data call via other wired or wireless channels, links or connections. The call may in embodiments be or include a direct-dialed, transferred, multi-party conference or other call or connection.

Once the call is initiated, according to embodiments of the invention in one regard the incoming call may be communicated to a service control point 106, which may for example be or include a server or other hardware along with a database engine or other resources. The service control point 106 may in turn communicate with a routing engine 108, which may likewise for instance be or include a server or other resource. The service control point 106, the routing engine 108 and other resources may for instance be incorporated in an Advanced Intelligent Network (AIN) configuration or network, a Signaling System 7 (SS7) network or other communications network or fabric, and may in embodiments include or interface to intelligent call management (ICM) hardware, software, Genesys™ Network Routing solutions or other call routing solutions.

According to embodiments of the invention, the routing engine 108 may host rules-based logic and other programmed or hardwired control to be applied to the incoming call, to analyze, route and manage the routing of the call to its destination. That destination as illustrated may be or include a number of local or remote physical or logical destinations including a local central office 112, an automatic call distributor 116, an interactive voice response farm 126 or other destination or site. The routing engine 108 in cooperation with the service control point 106 and other resources may analyze the call to generate an appropriate destination for the type and purpose of the call.

Towards those purposes, the routing engine 108 may capture, access or receive both call data and caller data as well as other information for routing and other purposes. Call data may therefore be or include data such as the dialed number identified via dialed number identification service (DNIS), calling number data such as a ten-digit or other telephone number generated via automatic number identification (ANI) or other services, time of day or date of call origination, the carrier over which the call arrives or which bills or services the call, or other call parameters related to or identifying the originating call.

Caller data may contain, for instance, caller entered data such as touch-tone, keypad, voice response or other inputs, for instance in response to a voice prompt, telephone typewriter (TTY) data or other menu or interface, such as for example account, subscriber, user name, social security or other identifiers or data. Caller data may likewise in embodiments include data retrieved from past transactions or exchanges, for instance automatically retrieved or identified via the caller's calling number, whether identified automatically or entered by the caller. Other types, categories and formats of data are possible. According to embodiments of the invention in one regard, the call data captured for a particular call may be temporarily or permanently stored to a call data store 124, or other local or remote storage or other facility.

According to embodiments of the invention in one regard, the routing engine 108 may typically receive the dialed number (DN), for instance an (800), (900) or other number, as part of the collection of call data on which to base the forward routing of the call. The call may require routing to a corresponding destination such as an ACD, IVR or other resource based on the call data and intended service. For example, in a financial services application a large organization which runs a mutual fund division may provide one (800) number such as "(800) 123-1111" for mutual fund customers wishing to call to access their accounts, while also providing an (800) number such as "(800) 123-2222" for a brokerage services division. Calls dialed to the first of those numbers may need to be routed to an interactive voice response farm 126, whose voice response units may for instance be programmed with menus configured to present common mutual fund options or other information.

Conversely, calls dialed to the second of those numbers may require routing to a resource such as ACD 116, which may distribute the call to a set of CSR workstations 118 staffed by customer service representative or other personnel knowledgeable or qualified to provide brokerage trades or advice. Other numbers, combinations of numbers and intended destinations are possible for various industries, applications and implementing architectures. In embodiments (800) number or other calls for different companies or other entities may be serviced by common communications links, routing engines and/or destination resources.

According to known implementations of routing architectures, the dialed (800) or other number might be used to identify which ACD, IVR or other resource which may be appropriate destination for the incoming call, for instance based on database checks in a service control point. That call delivery might be programmed using a dialed number identification service (DNIS) label, tag, number or other code, such as a 4-digit or other tag to be attached to an ACD or other destination number, and informing the destination which (800) or other number the caller 102 originally dialed in to. However, in call center or other environments which experience a comparatively high rate of incoming calls, for instance on the order of hundreds or thousands of calls per minute, or more or less, tying dialed numbers to destinations based on hardwired DNIS tags may tax or exceed the number of available connection ports, DNIS assignments or other resources required to support that volume of calls.

According to embodiments of the invention as illustrated in FIG. 2, however, overall system capacity is enhanced, flexibility increased and greater call volume may be serviced, due in part to an architecture permitting the generation of a dynamic DNIS 114, rather than a fixed DNIS assignment. Dynamic DNIS 114 may in one regard couple the call to a destination number 120 for delivery to resources supporting the call's intended destination. Dynamic DNIS 114 may in embodiments be based on a selector or identifier associated with the call which may be, include or be related to the originally dialed number. That is, according to embodiments of the invention in one regard, the 4-digit or other DNIS tag, code or other data which identifies to ACD 116, interactive voice response farm 126 or other destination the appropriate voice response menu or other resource corresponding to the service originally dialed into, may itself be assigned or re-assigned on a dynamic or changing basis.

In embodiments, the routing engine 108 may host or store a lookup table 110 storing the momentary assignments of one or more dynamic DNIS 114, in dynamic or pooled fashion. Because DNIS tags or other identifying data are not permanently assigned to dialed numbers and associated destinations, those tags or other codes or data may be used and re-used on the fly based on current usage at a given destination. This dynamic reallocation may expand the effective number of unique identifiers available to, and therefore the realized capacity of, the system at a given time.

Figure 3:
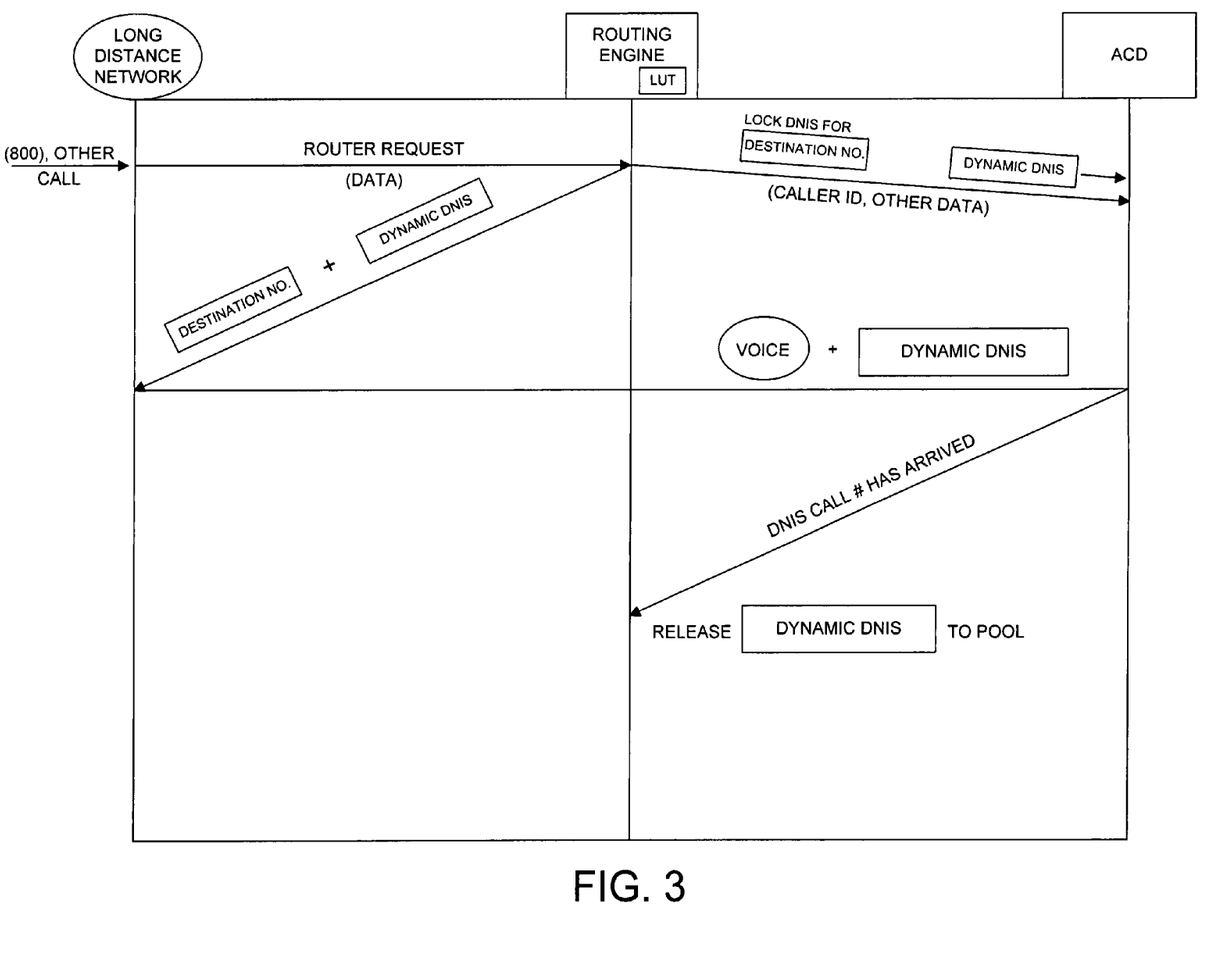
FIG. 3 illustrates a flow diagram of dynamic DNIS generation and transmission, according to embodiments of the invention.
Figure 4:
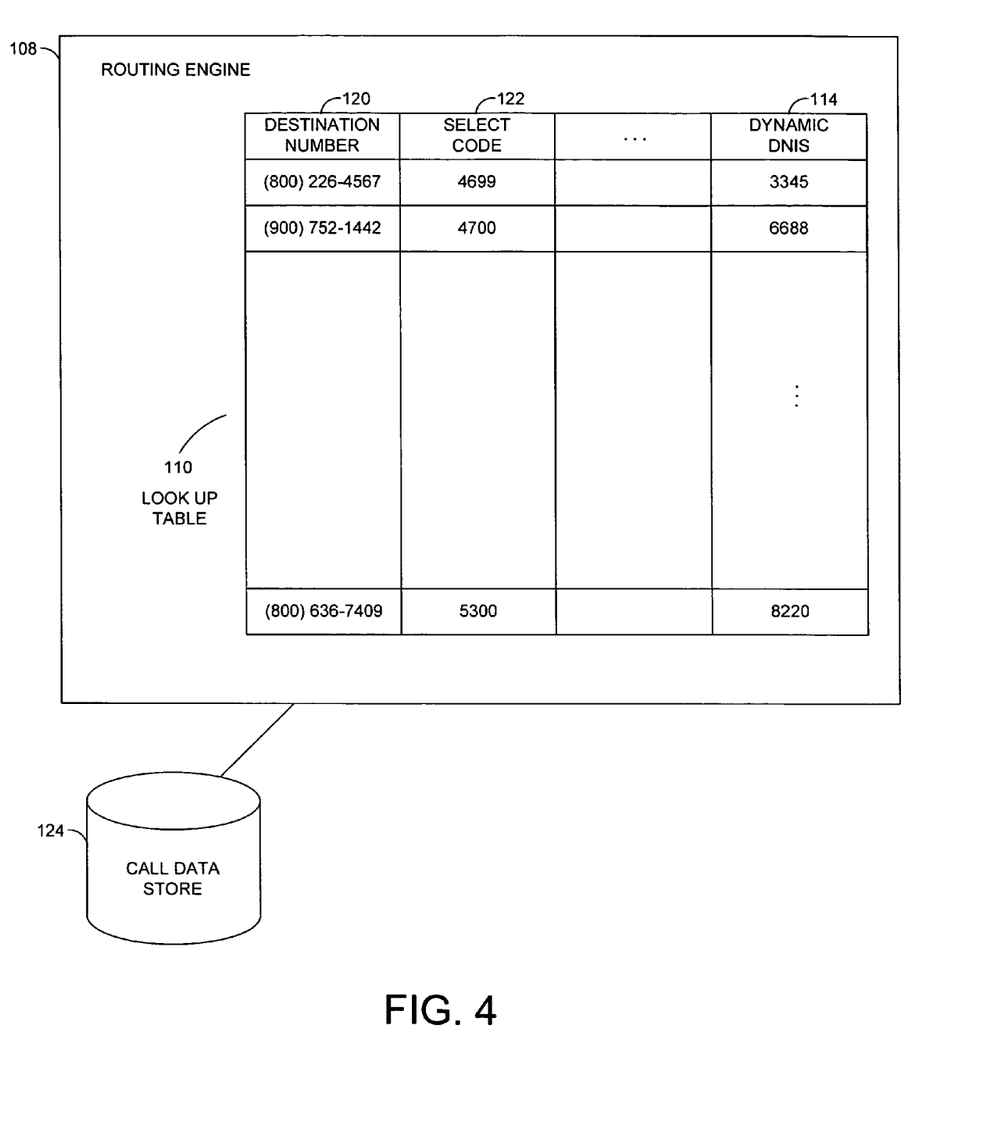
FIG. 4 illustrates a lookup table for dynamic DNIS translation and generation, according to embodiments of the invention.

In an illustrative call flow more particularly illustrated in FIG. 3, therefore, an (800) number or other call or request may be received via long distance network 104 or other network or channel, and communicated to routing engine 108. The routing engine 108 may transmit call data such as caller ID or other data, to ACD 116 based on destination number 120 for that ACD as well as a dynamic DNIS 114 assigned by routing engine 108 or other control for purposes of that call. As illustrated in FIG. 4, The dynamic DNIS 114 may be generated, for example, using a select code 122 which may be, include or be based on the originally dialed number as an identifier.

Select code 122, which may similarly include or be based on other information, may in turn act as a key or pointer into entries stored in lookup table 110. Lookup table 110 may store a dynamically assigned 4-digit or other DNIS code, tag or other data for that select code 122. According to embodiments of the invention in one regard, upon assignment of the dynamic DNIS 114 to the call for the given ACD 116 or other destination based on select code 122, routing engine 108 may lock that 4-digit or other DNIS code in lookup table 110 or otherwise. Placing a lock on that DNIS identifier during the duration of that call may serve to prevent data overwrites, misconnections or other corruption of the call by accidentally assigning the same DNIS code to another call to the same destination, at the same time.

The routing engine 108 may also return the destination number 120 for the ACD 116 to the long distance network 104, along with the dynamic DNIS 114 to permit the call to be connected to its intended destination. The call may thereafter be connected from long distance network 114 to the ACD 116, based on the destination number 120 and delivering dynamic DNIS 114 to the ACD 116 or other premises routing logic. When the call is successfully connected from long distance network 104 to ACD 116, the ACD 116 or other destination may transmit a message to routing engine 108 that the DNIS call number has arrived, after which the routing engine may release the temporary or dynamic DNIS 114 back to the available pool of DNIS assignments, reflected in lookup table 110 or otherwise. Because assignment of dynamic DNIS 114 to a call to a given destination is temporary and only locked during the duration of the call, other calls being delivered to the same ACD 116 or other destination may receive that DNIS assignment upon completion of the call.

Figure 5:
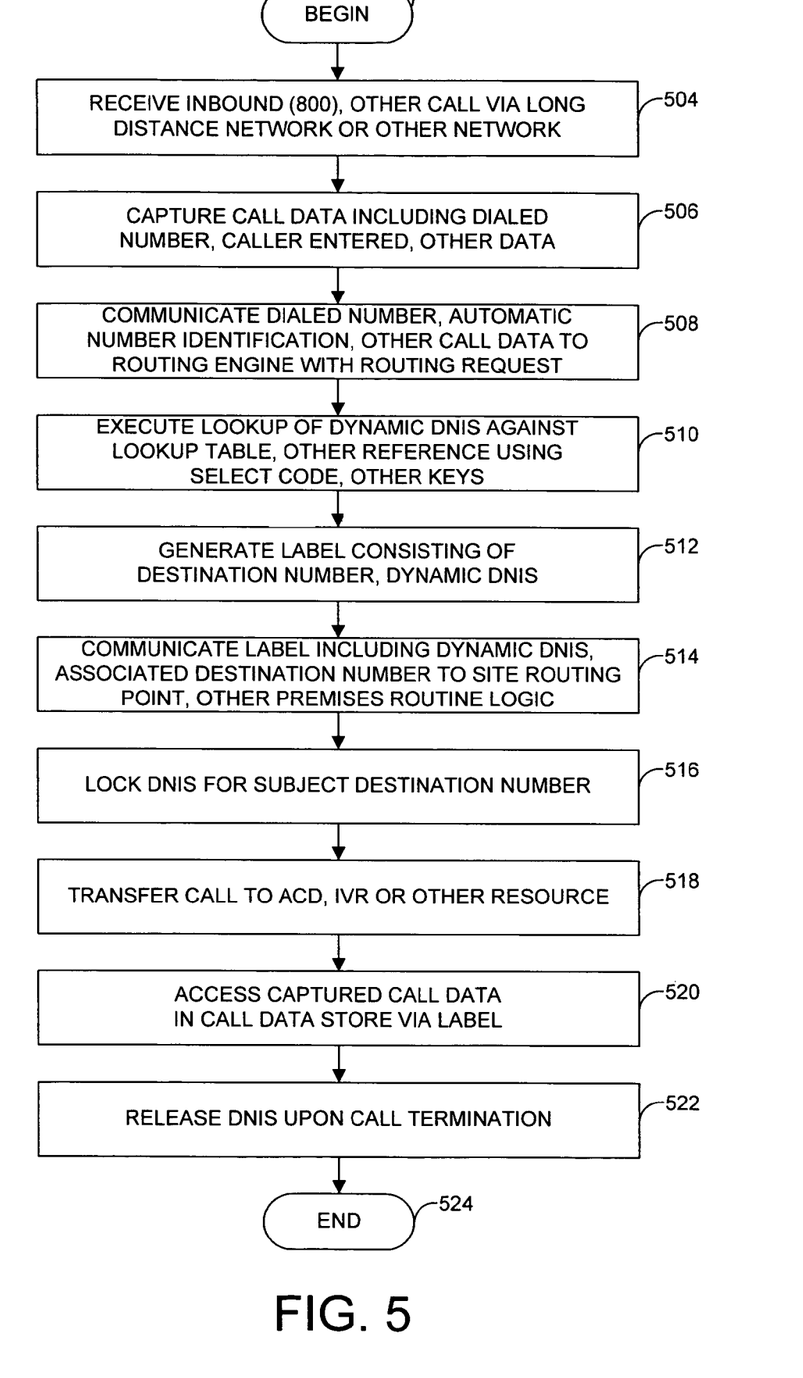
FIG. 5 illustrates overall dynamic DNIS processing, according to embodiments of the invention.

Overall DNIS call assignment and distribution processing is illustrated in FIG. 5. In step 502, processing may begin. In step 504, an inbound, transferred, conference or other (800) number, (900) number or other call or transaction may be received from caller 102 or otherwise, for instance via long distance network 104 or other network or connection. In step 506, call data related to the call including, for example, objective call data such as date, time of day, calling number identification (via caller ID, ANI or other services), called number identification, carrier identification or other data as well as caller-entered data such as account number, subscriber cellular or other data may be captured. In embodiments, that captured call data may be temporarily or permanently stored to call data store 124 or other location.

In step 508, the call data including components such as dialed number, ANI and other data or fields may be communicated to routing engine 108 along with a routing request or instruction to direct the call to an appropriate destination having a destination number 120. In step 510, a lookup of an assigned dynamic DNIS 114 may be executed against lookup table 110 or other resource using select code 122 or other keys. In step 512, a label consisting of destination number 120, dynamic DNIS 114 or other information may be generated in routing engine 108 or otherwise.

In step 514, the call label may be communicated to a site routing engine or other premises routing logic. In step 516, the dynamic DNIS 114 for the subject destination number 120 may be locked to prevent other calls from receiving an assignment of that DNIS or other identifier. In step 518, the call may be transferred to the destination represented in destination number 120, such as an ACD 116, interactive voice response farm 126 or other destination or resource.

In step 520, the call data captured in call data store 124 or other resource may be accessed using the dynamic DNIS 114, destination number 120 or other label components by the destination logic to assist in processing or further routing the call, for example to distribute the call to an appropriate CSR, to invoke an appropriate voice menu, access a corresponding database or take other action. In step 522, the dynamic DNIS 114 may be released upon termination of the call for use by other calls, for instance by update to lookup table 110 or otherwise. In step 524, processing may repeat, return to a prior processing point, jump to a further processing point or end.

The foregoing description of the invention is illustrative, and modifications in configuration and implementation will occur to persons skilled in the art. For instance, while the invention has generally been described in terms of an environment in which a routing engine hosts and delivers a dynamic DNIS assignment from a pool in a lookup table 110, in embodiments the dynamic or varying DNIS numbers or associated codes or tags may be stored in or accessed from difference resources, such as a dedicated database engine, remote server or other resource.

Similarly, while the invention has in embodiments been described as involving the delivery of calls based on their associated DNIS numbers, in embodiments calls may be identified, routed or otherwise processed based on identifiers other than DNIS numbers, depending on implementing protocol. Further, while the invention has generally been described as operating under control of one routing engine 108, in embodiments those control functions may be distributed amongst multiple controllers, processors or logic. Other hardware, software or other resources described as singular may in embodiments be distributed, and similarly in embodiments resources described as distributed may be combined. The scope of the invention is accordingly intended to be limited only by the following claims.

What is claimed is:

1. A system for generating a dialed number identifier, comprising:
    an interface to receive an incoming call to an originally dialed number via a network;
    a call data store for receiving captured call data related to the incoming call;
    a pool of available non-assigned dialed number identification service (DNIS) numbers; and
    a routing engine to temporarily assign an available non-assigned DNIS number to the incoming call and direct the incoming call to its destination according to the captured call data, and to lock the temporarily assigned DNIS number;
    wherein the pool of available non-assigned DNIS numbers is updated when the temporarily assigned DNIS number is released at termination of the incoming call and the released temporarily assigned DNIS number is made available to another incoming call from the pool of available non-assigned DNIS numbers.

2. A system according to claim 1, wherein the captured call data comprises a dynamic dialed number identification number based on the originally dialed number.

3. A system according to claim 1, wherein the network comprises a long distance network.

4. A system according to claim 1, wherein the originally dialed number comprises at least one of a toll-free number or a (900) number.

5. A system according to claim 1, wherein the network comprises at least one of a landline network, an over the air network, and a packet-switched network.

6. A system according to claim 1, wherein the destination comprises an automated call distribution resource.

7. A system according to claim 6, wherein the automated call distribution resource comprises at least one of an automated call distributor, an interactive voice response unit and a customer service representative workstation.

8. A system according to claim 1, wherein the routing engine performs a lookup of dialed number identification information against a lookup table to generate the dialed number identification information assigned to the incoming call.

9. A system according to claim 8, wherein the lookup table records currently available dynamic number identification information for a destination.

10. A method of generating a dialed number identifier, comprising:
    receiving a call to an originally dialed number via a network;
    generating temporary dynamic dialed number identification information based on the originally dialed number and a call state of a connecting call to a destination via a routing engine, wherein the call state comprises pendency of the connecting call to the destination;
    assigning temporary dynamic dialed number identification information to the originally dialed number;
    locking the temporary dynamic dialed number identification information assigned to the call during the pendency of the call to the destination;
    releasing the locked temporary dynamic dialed number identification information assigned to the call; and
    updating a pool of available unassigned dialed number identification information with the released dynamic dialed number identification information at termination of the call.

11. A method according to claim 10, wherein the temporary dynamic dialed number identification information comprises a dynamic dialed number identification number based on the originally dialed number.

12. A method according to claim 10, wherein the network comprises a long distance network.

13. A method according to claim 10, wherein the originally dialed number comprises at least one of a toll-free number or a (900) number.

14. A method according to claim 10, wherein the network comprises at least one of a landline network, an over the air network, and a packet-switched network.

15. A method according to claim 10, wherein the destination comprises an automated call distribution resource.

16. A method according to claim 15, wherein the automated call distribution resource comprises at least one of an automated call distributor, an interactive voice response unit and a customer service representative workstation.

17. A method according to claim 10, further comprising performing a lookup of dialed number identification information against a lookup table to generate the temporary dynamic dialed number identification information assigned to the call.

18. A method according to claim 17, wherein the lookup table records currently available dynamic number identification information for a destination.

19. A method of dynamically reallocating dialed number identification service (DNIS) numbers, the method comprising:
    receiving an incoming call to an originally dialed number via a network:
    capturing call data related to the incoming call and storing in a data store;
    communicating the call data and a routing request to a routing engine based on the originally dialed number and a call state of a connecting call to a destination, wherein the call state comprises pendency of the connecting call to the destination;
    assigning a dynamic DNIS number from a pool of available unassigned dynamic DNIS numbers to the incoming call via the routing engine;
    locking the assigned dynamic DNIS number during the pendency of the call to the destination;
    releasing the locked dynamic DNIS number from its assigned state via the routing engine upon termination of the incoming call;
    updating the pool of available unassigned dynamic DNIS numbers with the released dynamic DNIS number; and
    reassigning the released dynamic DNIS number to another incoming call.

20. The method according to claim 19, wherein the captured call data comprises a dynamic dialed number identification number based on the originally dialed number.

21. The method according to claim 19, wherein the network comprises a long distance network.

22. The method according to claim 19, wherein the originally dialed number comprises at least one of a toll-free number and a (900) number.

23. The method according to claim 19, wherein the network comprises at least one of a landline network, an over the air network, and a packet-switched network.

24. The method according to claim 19, wherein the destination comprises an automated call distribution resource.

25. The method according to claim 24, wherein the automated call distribution resource comprises at least one of an automated call distributor, an interactive voice response unit and a customer service representative workstation.

26. The method according to claim 19, wherein the method further comprises performing a lookup of available unassigned dynamic DNIS numbers against a lookup table to generate the dynamic DNIS number assigned to the call.

27. The method according to claim 26, wherein the lookup table records currently available dynamic DNIS numbers for a destination.

28. A method of generating temporary dialed number identification service (DNIS) numbers, the method comprising:
    receiving a call to an originally dialed number via a network;
    dynamically extracting a temporary unassigned DNIS number from a pool of available unassigned DNIS numbers;
    assigning the extracted temporary DNIS number to the call based on the originally dialed number and a call state of connecting call to a destination, wherein the call state comprises pendency of the connecting call to the destination;
    locking the assigned temporary DNIS number during the pendency of the call to the destination;
    removing the assigned temporary DNIS number from the pool of available unassigned DNIS numbers during the pendency of the call to the destination, thereby preventing a conflict of the call to its destination;
    releasing the assigned temporary DNIS number upon termination of the call from its assigned state; and
    adding the released unassigned temporary DNIS number to the pool of available unassigned DNIS numbers.

29. The method according to claim 28, wherein the temporary DNIS number comprises a dynamic dialed number identification number based on the originally dialed number.

30. The method according to claim 28, wherein the network comprises a long distance network.

31. The method according to claim 28, wherein the originally dialed number comprises at least one of a toll-free number or a (900) number.

32. The method according to claim 28, wherein the network comprises at least one of a landline network, an over the air network, and a packet-switched network.

33. The method according to claim 28, wherein the destination comprises an automated call distribution resource.

34. The method according to claim 33, wherein the automated call distribution resource comprises at least one of an automated call distributor, an interactive voice response unit and a customer service representative workstation.

35. The method according to claim 28, wherein the method further comprises performing a lookup of available temporary DNIS numbers against a lookup table to generate the temporary DNIS number assigned to the call.

36. The method according to claim 35, wherein the lookup table records currently available dynamic number identification information for a destination.

\* \* \* \* \*